INVENTORS.
EDWARD P. BULLARD
HAROLD C. ANDERSON
BY
ATTORNEY.

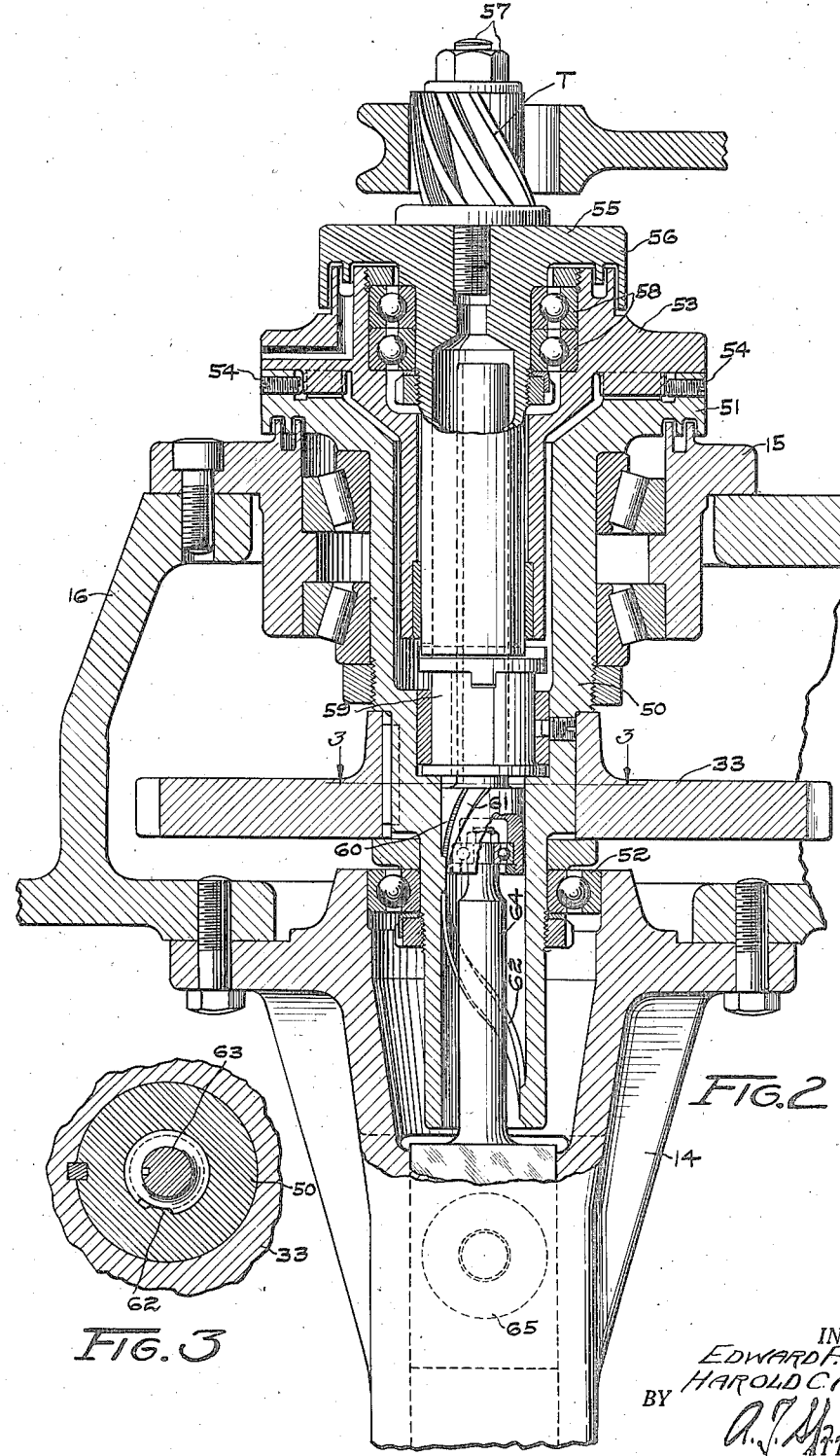

Patented June 23, 1936

2,044,829

UNITED STATES PATENT OFFICE 2,044,829

APPARATUS FOR STATIONARY WORK TURNING

Edward P. Bullard, Bridgeport, and Harold C. Anderson, Fairfield, Conn., assignors to The Bullard Company, a corporation of Connecticut Application March 25, 1933, Serial No. 662,748

11 Claims. (Cl. 82—1)

This invention relates to a method and apparatus for turning metal through the use of a multi-bladed cutter, the blades of which are stepped to extend different radial distances from the axis of the cutter so that by a single revolution of the cutter, the work may be successively reduced by the different blades. The method is similar to and partakes of the advantages of the method set forth in Patent No. 1,899,608, dated February 28, 1933, but is distinguished therefrom by the fact that the work is stationary while the cutter moves bodily in an orbital path at cutting speed and rotates on its own axis at feeding speed to bring the blades into successive cutting relation with the work surface.

It is among the primary objects of the invention to provide a metal turning method which will partake of the inherent advantages of the "relay cutting" as set forth in the above patent but in which the work may be stationary.

A further object is to provide a method of turning a work surface by subjecting stationary work to the successive action of blades, each of which move relative to the work at cutting speed and are successively brought into cutting contact with the work surface.

Other objects of the method are to provide simplicity of operation thus to confine all the relative movements of work and cutter to bodily movements of the cutter alone.

Other numerous objects of the method will be apparent from a consideration of the following specification.

It is a further general object of the invention to provide a simple, compact apparatus for carrying out the method set forth.

Another object is to provide an apparatus which will stationarily retain the work piece and which will move a cutter both in an orbital path at cutting speeds and on its own axis at feeding speeds thus to accomplish the method outlined.

Another object is to provide an apparatus of the character set forth which includes means for changing both the speed of the orbital movement and the speeds of the feeding movement either together or independently and which may be arranged to automatically stop operations after one completed cycle of operation.

A further important object is to provide a metal working tool spindle which independently with the apparatus with which it is associated will move a cutting tool in an orbital path and will concurrently therewith rotate a tool on its own axis.

Other objects of the apparatus are to provide such a structure which will be economical in manufacture as well as in operation, which will provide for adjustments and will in general conform to the best practices of machine tool design. Numerous changes and advantages will be apparent from a consideration of the following specification taken in connection with the accompanying drawings.

As above referred to, the method in general consists in retaining a work piece in fixed position and subjecting it to the successive action of a plurality of blades of a step-bladed cutter by moving the cutter in an orbital path at cutting speeds slowly rotating the cutter on its own axis so as to successively bring the cutting blades into cutting relation with the surface. The cutting action thus achieved is clearly distinguished from a milling action by which the surface is subjected to repeated successive gouging actions of a blade, in that in the present method, a single blade sweeps the entire work surface while moving at cutting speeds and thus performs a skiving cutting action which reduces the entire work surface an amount proportionate to the radial extension of the blade and thereafter subjects the work to the next successive blade which extends a further radial distance and which in turn reduces the entire surface a further proportionate amount and so on for each blade of the cutter. The method distinguishes from the patent above referred to in that it permits the work to be stationary, the movement at cutting speed as well as the movement at feeding speed being movements of the cutter alone thus making the invention applicable to various large and/or peculiarly shaped pieces which normally require large sweep surfaces for their revolution.

The apparatus consists in general of a source of power, a main clutch and a drive therefrom to the work spindle for rotating at cutting speeds and a branch connection therefrom to means for rotating the cutter on its axis as distinguished from the rotation of the spindle, it being understood that the cutter is eccentrically mounted on the spindle so that its rotation on its axis will bring the successive blades into cutting relation with the work surface. The apparatus further includes means for varying the spindle speed and like means for varying the feeding speeds independently of the speed of the spindle. The apparatus further includes automatic means for disengaging the clutch at the end of a cycle of tool rotation.

An important feature of the apparatus is the spindle itself which may form a part of the apparatus or which is applicable to various other types of apparatus. The spindle comprises an outer tubular member which is driven by a gear to be rotated preferably at cutting speeds and on which is mounted an eccentrically disposed tool carrier which is connected with means for rotating it on its own axis independently of the spindle proper thus providing for rapid orbital movement of the cutter and for simultaneous rotation of the cutter on its own axis.

With regard to the tool which is to be used with the method and apparatus here set forth, it will be understood that the invention is not confined to any specific type of tool, it being understood that many forms of multiple bladed cutters in which at least some of the blades extend different radial differences may be employed. As an illustration, however, reference may be had to the cutter illustrated in the above mentioned patent which is formed of radially stepped elongated and spirally arranged blades. Other types of cutters designed for use in the practice of the method here outlined will form the subject matter of other applications.

With reference to the drawings

Fig. 2 is an enlarged vertical section of the spindle of the apparatus shown in Fig. 1 and Fig. 3 is a section taken on the line 3—3 of Fig. 2.

Figure 1:
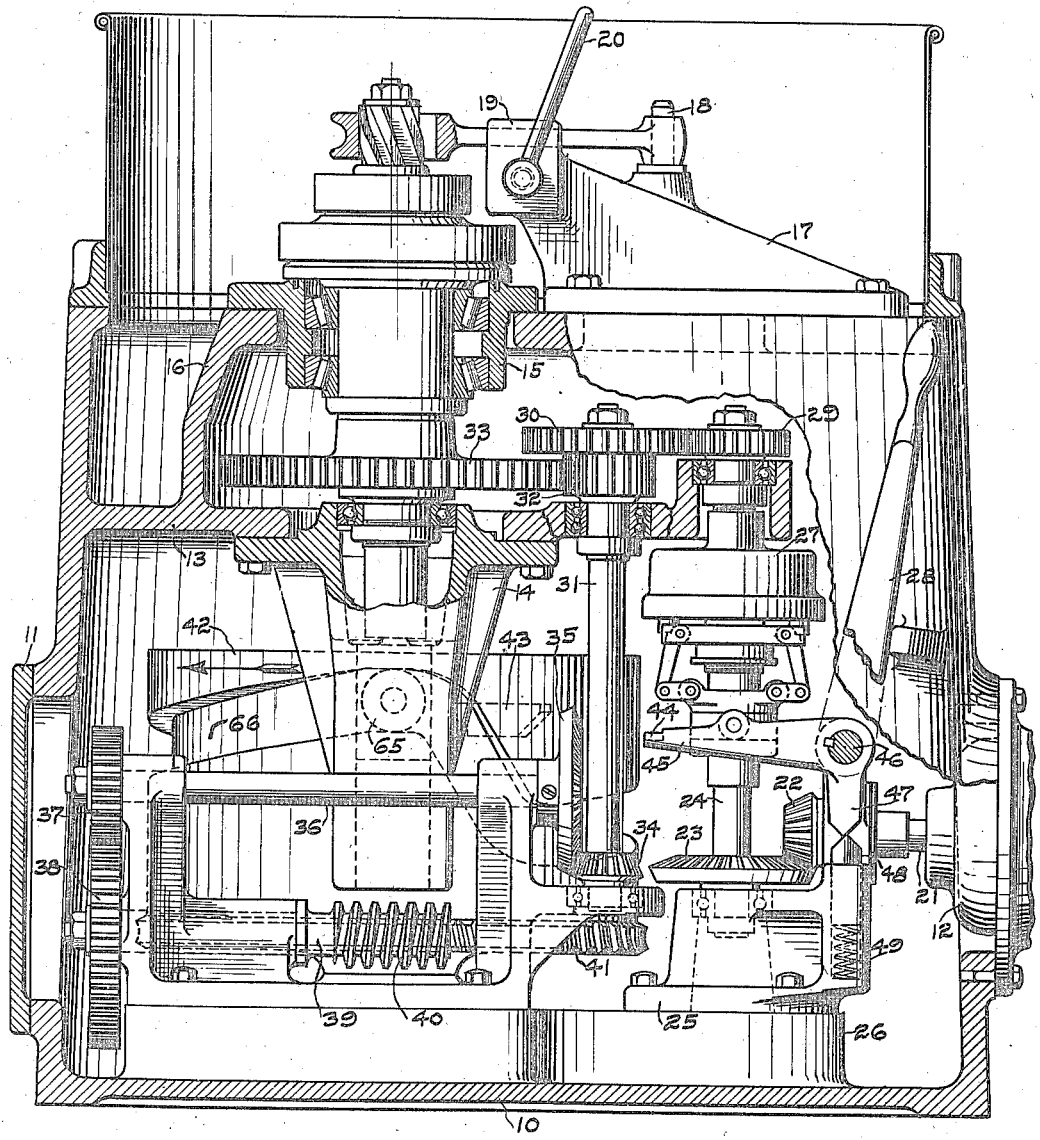
Fig. 1 is a side elevation partly broken away and in section, showing one specific embodiment of the apparatus of the present invention.

Referring to Fig. 1 of the drawings, it will be seen that the apparatus of the invention consists of a base housing structure 10 which is apertured front and rear, the front being provided with a removable cover plate 11 to give access to the mechanism while the rear aperture is adapted to receive a motor bracket 12. A transverse supporting shelf 13 is provided in the housing, it being apertured to receive a lower spindle bracket 14 and it is also adapted to receive therethrough transmission shafts and their bearings as will be hereinafter referred to. The top of the housing is also apertured to receive therethrough the upper spindle bracket 15 forward of which the top extends downwardly as at 16 to meet the shelf 13 thereby forming a suitable chip trough.

The top of the housing has mounted thereon a work holding fixture 17. Obviously, the specific structure of the fixture will vary in accordance with the type of work to be operated upon. In the present instance, the work is depicted as a connecting rod, the crank shaft end of which is being internally finished. The fixture therefore includes a pintle 18 which may receive thereover the piston end of the rod while the shank of the rod may be secured by vise-like jaws 19 controlled through an operating handle 20.

The motor shaft 21 is provided with a bevel gear 22 mating with a companion bevel gear 23 upon a shaft 24, the lower end of the shaft, as well as the inner end of the motor shaft, being journaled in a suitable bracket 25 mounted on the base projection 26 of the housing. Rotation of the mechanism in response to the normally continuous rotation of the motor and shaft 24 is provided through a conventional clutch 27 which may be manually operated from a clutch handle 28 or which may be automatically operated from the cam drum of the machine in a manner hereafter to be discussed. With the clutch in engaged position, rotation of the shaft 24 will effect rotation of the gear 29 which meshes with a companion gear 30 on a vertical shaft 31 which lies parallel to the vertical initial drive shaft 24. As indicated, the gears 29 and 30 may be removed and changed to vary the speed ratio of the shaft 24 with respect to the shaft 31.

The shaft 31 is provided with a gear 32 meshing directly with spindle gear 33. While its lower end is provided with a bevel gear 34 meshing with a companion bevel gear 35 on a horizontal shaft 36, the forward end of which carries a gear 37 meshing with a gear 38 which drives a worm shaft 39, the worm 40 of which meshes with worm teeth 41 on the lower end of a rotary cam 42. The gears 37 and 38 are adapted to be removed and changed as are the gears 29 and 30 so as to vary the speed of the cam independently of the speed of the spindle.

It will be seen that changes in the gear ratios of gears 29 and 30 will change the speed of both the spindle and the cam drum. However, the cam drum speed may be varied independently of the spindle speed by changing of the gears 37 and 38. It will be noted from inspection of the gear arrangement that the spindle is adapted to be rotated many times in response to single rotation of the cam. As will hereinafter be outlined in connection with the method employed, it will be found that a single rotation of the cam will constitute one cycle of operation of the mechanism. Therefore, the cam is provided with a clutch controlling lug 43 which at the end of a single cycle of rotation is adapted to strike the end 44 of a clutch operating arm 45, the opposite end of which is mounted on the manually controllable clutch lever fulcrum as at 46. The arm 45 is also provided with an arrow head 47, the faces of which are adapted to successively engage the faces of a spring pressed plunger 48 so that initial movement of the arm by the cam lug will pass the arrow head across dead center and permit its full actuation by the force of the spring 49; thus permitting the cam 43 to pass on and off the end 44 of the arm prior to the cessation of cam rotation by the disengagement of the clutch.

With reference more particularly to Fig. 2, it will be seen that the spindle is of tubular construction, its body 50 forming a face flange 51 and extending downwardly within the adjustable upper bracket 15 below which the spindle gear 33 is mounted on the body, the lower end of the body being mounted in the lower bracket 14 as by the bearing 52. The face 51 of the spindle is adapted to receive thereon an eccentrically positioned tool plate 53, the eccentricity of which to the axis of the spindle body may be altered by the adjustment of the set screws 54. Mounted upon the plate 53 for independent rotation at feeding speeds is the tool holder 55 which by interengagement of the flange 56 is retained in the adjusted eccentricity with respect to the spindle body and which receives thereon the tool T.

Any conventional mounting of the tool may be utilized. In the present instance it is shown as secured to the head by nut and bolt construction as indicated at 57. The eccentric holder 55 extends downwardly through anti-friction bearing 58, its lower end being joined as by an Oldham coupling 59 with a vertically movable nut 60, the outer face of which is provided with a screw path 61 cooperating with a helical thread 62 in the lower end of the spindle body. The nut 60 is formed on the lower end of a keyed shaft 63 which engages the lower half of the Oldham coupling so that rotation of the shaft will transmit rotation to the tool holder 55. Reciprocation of the nut and thus rotation of the tool head is effected by the engagement of the nut internally with the upper end of a slide rod 64, the lower end of which carries a roller 65 which engages the cam path 66 of the cam drum 42.

In the operation of the device it may be assumed that the motor is constantly rotated and thus rotating shaft 21 with the gears 22 and 23 and the shaft 24. With the apparatus standing at the beginning of a cycle of operation the clutch lever 28 may be moved outwardly to cause rotation of the gear 29 with the shaft 24. Thereupon shaft 31 will be rotated thus rotating the spindle gear 33 whereby the tubular spindle body will be rotated at cutting speeds. At the same time, the cam will be rotated in the direction of the arrow in Fig. 1, thus to slowly move upwardly the cam roll 65 which movement will move upward the nut causing its thread to transverse the screw 61 thus to rotate, through the Oldham coupling, the tool holder 55. In the design of the apparatus herein illustrated, the tool head will be rotated substantially one revolution at slow speed forward and before the end of the cam cycle the roller 65 will be moved in the steep downward path of the cam to return the tool to its original position. Simultaneously, therewith the lug 43 will strike the inner end of the clutch arm and throw the arm past the arrow head thus to move the clutch to a disengaged position to stop the apparatus. Obviously, the apparatus may be modified. For instance, the automatic disengagement of the clutch may be departed from and the cam path may be altered to change the cycle of tool movement.

From the foregoing consideration of the apparatus, it will be seen that the method consists of stationarily securing the work over the tool, it being understood that this is accomplished with the tool in zero position at which an unbladed portion is more closely adjacent the surface to be finished. With the work in such position, the throwing of the clutch will initiate rotation of the spindle body which by virtue of the eccentricity of the tool mounting will move the tool radially in an orbital path. The cam movement will cause the tool to be rotated on its own axis thus to advance the stepped blades of the cutter. Each blade will thus sweep the entire work surface to be finished before the continued rotation of the tool will bring the next successive blade into position to sweep the surface and thereby to further reduce such surface.

With regard to the cutting action, it will be seen that as in connection with the method of the patent above mentioned, the action of the blade on the work is a skiving continuous cutting action. As shown by the blade in Fig. 2, the cutting action will pass down the blade by virtue of its spiral configurations. The more advanced portion of the spiral will first engage the work surface and a continuous cutting action will ensue and pass down the blade edge as the cutter is moved on its axis thus subjecting the whole surface to the sweeping continuous cutting action of each blade.

Briefly, therefore, the method consists in retaining the work in stationary position and subjecting it to the continuous successive action of a plurality of blade edges which move in an orbital path and successively contact the work surface.

Obviously, numerous changes, modifications and the full use of equivalents may be resorted to in the practice of the invention without departing from the spirit or scope thereof as outlined in the appended claims.

Having thus set forth the nature of our invention, what we claim is:

1. A machine tool including a stationary work holder, a tool holder, means for moving said tool holder in an orbital path at cutting speeds and means to move the tool holder on its own axis at feeding speed, one of said means including a reciprocating arm.

2. A machine tool including a stationary work holder, a tool holder, means for moving said tool holder in an orbital path at cutting speeds and means to move the tool holder on its own axis at feeding speed, one of said means including a reciprocating arm and cam means for actuating it.

3. A machine tool including a stationary work holder, a tool holder, means for moving said tool holder in an orbital path at cutting speeds and means to move the tool holder on its own axis at feeding speed in synchronism with the movement thereof in an orbital path.

4. A machine tool including means for holding a work piece stationary with respect to a tool, a tool and holder therefore, means for moving the tool in an orbital path at cutting speed, means for moving the tool upon its own axis and a single driving train for both of said means.

5. A machine tool including means for holding a work piece stationary with respect to a tool, a tool and holder therefore, means for moving the tool in an orbital path at cutting speed, means for moving the tool upon its own axis and a single driving train for both of said means and automatic means for controlling said driving train.

6. A machine tool including means for holding a work piece stationary with respect to a tool, a tool and holder therefore, means for moving the tool in an orbital path at cutting speed, means for moving the tool upon its own axis and independent variable drive for each of said means.

7. A machine tool including means for holding a work piece stationary with respect to a tool, a tool and holder therefore, means for moving the tool in an orbital path, means for moving the tool upon its own axis and a single driving train for both of said means and automatic means for controlling said driving train.

8. A machine tool including means for holding a work piece stationary with respect to a tool, a tool and holder therefore, means for moving the tool in an orbital path, means for moving the tool upon its own axis and independent variable drive for each of said means.

9. In a machine tool, a hollow, rotatable spindle body, a tool spindle, a multi-bladed tool therefor mounted therein eccentric to the axis thereof, means for rotating said body at cutting speeds and means for rotating said tool spindle on its own axis at a feeding speed to successively present the blades thereof to a work surface.

10. In a machine tool, a hollow, rotatable spindle body, a tool spindle, a multi-bladed tool therefor mounted therein eccentric to the axis thereof, means for rotating said body at cutting speeds, means for rotating said tool spindle on its own axis at a feeding speed to successively present the blades thereof to a work surface, and threaded means for rotating said tool spindle.

11. In a machine tool, a hollow, rotatable spindle body, a tool spindle, a multi-bladed tool therefor mounted therein eccentric to the axis thereof, means for rotating said body at cutting speeds, means for rotating said tool spindle on its own axis at a feeding speed to successively present the blades thereof to a work surface, threaded means for rotating said tool spindle, and cooperating screw and nut means for rotating said tool spindle.

EDWARD P. BULLARD.
HAROLD C. ANDERSON.